United States Patent
Tyburski et al.

(10) Patent No.: US 10,471,781 B2
(45) Date of Patent: Nov. 12, 2019

(54) PNEUMATIC VEHICLE TIRE

(71) Applicant: Continental Reifen Deutschland GmbH, Hannover (DE)

(72) Inventors: Andreas Tyburski, Ilsede (DE); Oliver Schuermann, Langenhagen (DE); Michael Schwarz, Hannover (DE); Joerg Goener, Sehnde (DE); Joe Guardalabene, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 211 days.

(21) Appl. No.: 15/279,029

(22) Filed: Sep. 28, 2016

(65) Prior Publication Data

US 2017/0015146 A1   Jan. 19, 2017

Related U.S. Application Data

(63) Continuation of application No. PCT/EP2015/051296, filed on Jan. 23, 2015.

(30) Foreign Application Priority Data

Mar. 31, 2014   (DE) .................. 10 2014 206 009

(51) Int. Cl.
  *B60C 19/12*   (2006.01)
  *B60C 19/00*   (2006.01)
  *B29D 30/06*   (2006.01)

(52) U.S. Cl.
  CPC ........ *B60C 19/002* (2013.01); *B29D 30/0685* (2013.01); *B60C 19/122* (2013.01); *B60C 19/125* (2013.01); *Y10T 152/10684* (2015.01)

(58) Field of Classification Search
  CPC ................ B60C 19/002; B60C 19/122; Y10T 152/10666–10693

(Continued)

(56) References Cited

U.S. PATENT DOCUMENTS 4,392,522 A   7/1983   Bschorr
8,336,592 B2   12/2012   Sawada et al.
(Continued)

FOREIGN PATENT DOCUMENTS

DE   10 2007 028 932 A1   12/2008
EP   0029120 A1   5/1981
(Continued)

OTHER PUBLICATIONS

"Cellular Materials", Encyclopedia of Polymer Science and Technology, 1st ed., vol. 5, Daniel Imeokparia et al., John Wiley & Sons, Inc., Oct. 15, 2003, p. 419.*

(Continued)

*Primary Examiner* — Adrienne C. Johnstone

(57) ABSTRACT

A pneumatic vehicle tire is provided. The tire includes a tread, an inner surface lying opposite the tread, a self-sealing sealant and a sound-absorbing open-cell foam ring arranged inside the pneumatic vehicle tire. The foam ring is adhesively attached to the inner surface and adheres to the self-sealing sealant which is applied before the sound-absorbing open-cell foam ring is attached to the inner surface. The self-sealing sealant has, at least immediately after being applied, a tackiness required for an adhesive attachment of the sound-absorbing open-cell foam ring. A closed-cell material ring is arranged between the sound-absorbing foam ring and the self-sealing sealant to prevent a diffusion of the sealant into the open-cell foam ring. The closed-cell material ring effects an airtight condition.

15 Claims, 3 Drawing Sheets

(58) Field of Classification Search
USPC .................................................. 152/504, 505
See application file for complete search history.

(56) References Cited

U.S. PATENT DOCUMENTS

| | | | |
|---|---|---|---|
| 8,430,143 | B2 | 4/2013 | Tanno |
| 2003/0150544 | A1 | 8/2003 | Naito et al. |
| 2008/0099117 | A1 | 5/2008 | Tanno |
| 2010/0126647 | A1 | 5/2010 | Hashimura et al. |
| 2010/0307655 | A1* | 12/2010 | Tanno .................. B60C 19/002 152/504 |
| 2012/0073717 | A1 | 3/2012 | Agostini et al. |

FOREIGN PATENT DOCUMENTS

| | | |
|---|---|---|
| EP | 2058142 A1 | 5/2009 |
| JP | 2003011626 A | 1/2003 |
| JP | 2011-20479 A | 2/2011 |
| JP | 2012071601 A | 4/2012 |
| WO | 2006088000 A1 | 8/2006 |

OTHER PUBLICATIONS

International Search Report dated Apr. 13, 2015 of international application PCT/EP2015/051296 on which this application is based.

* cited by examiner

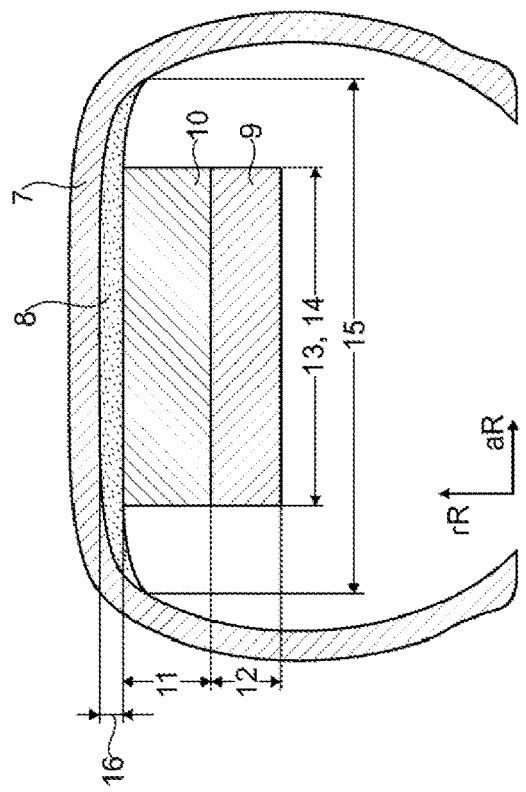

It is expedient if the supports are arranged in the circumferential direction of the tire, transversely to the circumferential direction of the tire or at an angle thereto, continuously or discontinuously. As a result, the circumferential stiffness in the circumferential direction or transversely thereto is increased.

According to another aspect of the invention, the closed-cell material ring 10 is divided and lies with its radially inner surface fully flush up against the open-cell foam ring 9. The support on the sealant 8 is provided by 2 or more supports.

FIG. 5

PNEUMATIC VEHICLE TIRE

CROSS REFERENCE TO RELATED APPLICATIONS

This application is a continuation application of international patent application PCT/EP2015/051296, filed Jan. 23, 2015, designating the United States and claiming priority from German application 10 2014 206 009.5, filed Mar. 31, 2014, and the entire content of both applications is incorporated herein by reference.

FIELD OF THE INVENTION

The invention relates to a pneumatic vehicle tire with a sound-absorbing foam ring inside it, adhesively attached to the inner surface opposite from the tread, the foam ring adhering to a previously applied, self-sealing sealant, which at least immediately after its application has a tackiness required for the adhesive attachment of the foam ring.

BACKGROUND OF THE INVENTION

Such a pneumatic vehicle tire is known from DE 10 2007 028932 A1. The foam ring reduces the vibration of air in the tire and leads to an improvement in the noise conditions in the vehicle. The foam ring consists of an open-cell foam and is also referred to as an "inner absorber". The sealant that is subsequently applied to the inner side of the ring after the operation of heating the tire has two functions: it seals an undesired puncture of the tire in the region of the tread, in that, in the event of damage to the inner layer, the viscous sealant flows into the location of the damage. Moreover, the sealant serves at the same time as a "bonding agent" for securing the sound-absorbing foam ring.

However, the flow characteristics of the sealant may be adversely affected by the foam ring lying on the sealant, so that the desired sealing effect only occurs after a delay or not at all. In cases in which the penetrating foreign body comes out of the tire again and leaves a large air channel, reliable sealing by the sealant with adversely affected flow characteristics is particularly difficult.

SUMMARY OF THE INVENTION

It is an object of the invention to improve the sealing of the tire in the event of punctures.

The object is achieved by providing a pneumatic vehicle tire including: an inner surface; a tread; a self-sealing sealant; a sound-absorbing open-cell foam ring arranged inside the pneumatic vehicle tire and being adhesively attached to the inner surface opposite from the tread; the sound-absorbing open-cell foam ring adhering to the self-sealing sealant; the self-sealing sealant being applied before the sound-absorbing open-cell foam ring is attached to the inner surface; the self-sealing sealant having at least immediately after being applied a tackiness required for an adhesive attachment of the sound-absorbing open-cell foam ring; a closed-cell material ring arranged between the sound-absorbing foam ring and the self-sealing sealant; and, the closed-cell material ring having an airtight effect.

According to an aspect of the invention, the closed-cell foam ring has an airtight effect and is arranged between the sound-absorbing foam ring and the sealant.

According to another aspect of the invention, the closed-cell foam ring lying directly on the sealant provides an airtight seal in the event of a puncture. This sealing of the closed-cell foam ring has the effect of ensuring the sealing effect of the tire in cases of punctures in spite of the sealant having adversely affected flow characteristics. In the regions in which the flow characteristics of the sealant are not adversely affected by a ring lying on it, the sealant continues as before to provide a reliable seal.

It is advantageous if the closed-cell material ring consists of foam or of cork or of elastomer or of a combination of the aforementioned materials. It is important that the aforementioned materials are lightweight, that is, have a low relative density, and have a largely airtight effect.

It is expedient if the closed-cell material ring and the open-cell foam ring are bonded to one another by an adhesive. This ensures a defined position of the closed-cell material ring. The composite including the closed-cell foam and the open-cell foam can thus be assembled in one working step.

It is expedient if the closed-cell material ring has a maximum radial thickness of ≤50 mm, preferably a radial thickness of 20 mm to 40 mm. This achieves the effect that at least 90% of all penetrating foreign bodies remain within the material ring and the airtightness is ensured.

It is advantageous if the open-cell foam ring has a radial thickness of <60 mm, preferably a radial thickness of 10 mm to 40 mm. This results in an optimum ratio of the amount of material, and consequently costs, to the noise absorption characteristics.

All sealants that are self-sealing and, at least immediately after application to the inner surface of the tire, are tacky enough that the foam ring can be pressed into place and in this way adhesively bonded with the sealant, come into consideration within the scope of the invention. Therefore, sealants based on polyurethane or sealants that are a viscous mixture based on a butyl rubber, a polybutene or based on silicone are suitable for example.

According to an aspect of the invention, the closed-cell material ring lies with its radially outer surface fully flush on the sealant and lies directly with its radially inner surface fully flush up against the open-cell foam ring, the width of the closed-cell material ring preferably corresponding approximately to the width of the open-cell foam ring.

According to another aspect of the invention, the closed-cell material ring is divided and lies with its radially inner surface fully flush up against the open-cell foam ring. The support on the sealant is provided by 2 or more supports.

It is advantageous if the layer thickness of the sealant in those regions in which the closed-cell material ring lies directly on the sealant is <2 mm, preferably <1 mm, while the layer thickness of the sealant in those regions in which the closed-cell material ring does not lie directly on the sealant is between 2 mm and 8 mm, preferably <5 mm. In those regions in which the closed-cell material ring lies on the sealant, the latter can be reduced in its thickness, which has an advantageous effect on the production costs of the tire. In those regions in which no material ring lies on the sealant, the flow characteristics of the viscous sealant are unaffected and provide a reliable seal in the event of punctures with its usual thickness of preferably <5 mm.

It is expedient if the supports are arranged in the circumferential direction of the tire, transversely to the circumferential direction of the tire or at an angle thereto, continuously or discontinuously. As a result, the stiffness in the circumferential direction or transversely thereto is increased.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
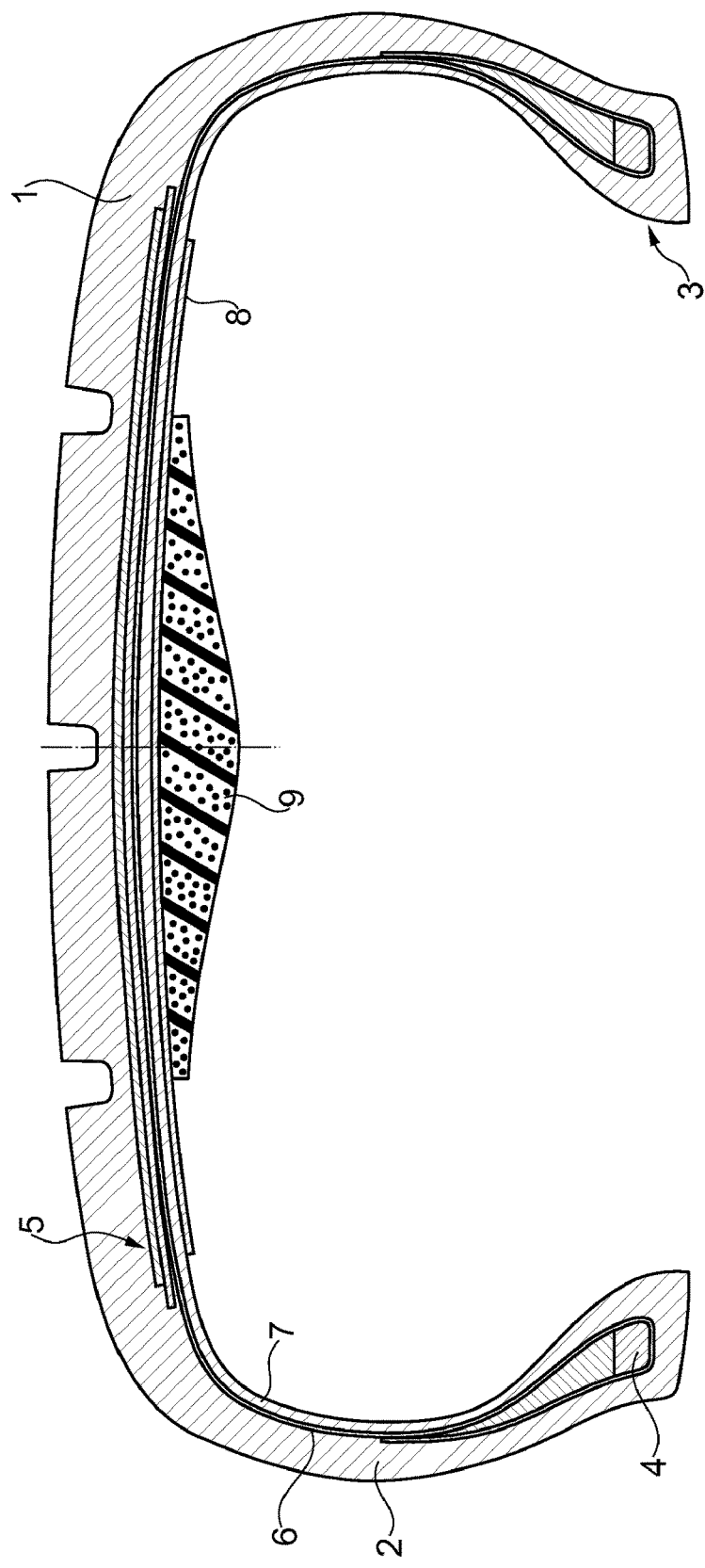
FIG. 1 shows a cross section through a pneumatic vehicle tire of the prior art.

A cross section through a radial car tire is shown in FIG. 1, which has a profiled tread 1, sidewalls 2, bead regions 3, bead cores 4 and also a multi-ply breaker belt assembly 5 and a carcass insert 6. On its inner surface, the tire is covered with an inner layer 7 of an airtight rubber compound. On the inner surface of the inner layer 7 opposite from the tread 1, a sealant 8 that is capable of acting in a self-sealing manner in the event of a puncture—damage to the tire—is subsequently applied (to the finished tire). Adhesively attached to the sealant 8 is a sound-absorbing foam ring 9, which is pressed onto the sealant 8 immediately after application of the sealant 8, while the latter is still sufficiently tacky, as described below.

With respect to its sound-absorbing properties, the sound-absorbing foam ring 9 is matched to the frequency of the tire cavity. For example, the foam ring has here an approximately elongate-triangular cross section that is symmetrical with respect to the equator of the tire. The foam of the foam ring 9 is an open-cell foam, since this is best suited for absorbing sound. As a sealant, polyurethane gels or viscous mixtures based on butyl rubbers, polybutenes or silicone, for example, come into consideration. The mixtures can contain the usual further constituents, such as extender oils.

The sealant is applied, for example by spraying, in such a way that it covers at least the inner surface opposite from the tread 1. For optimum distribution of the sealant on the inner surface, the tire may be made to rotate. The sealant is also introduced in such an amount that the layer thickness of the sealant is between 2 mm and 8 mm. At least immediately after application, the sealant should be relatively liquid and tacky. At this time, the prefabricated foam ring 9 is introduced into the interior of the tire and pressed into place. After fully reacting, the foam ring 9 adheres to the sealant 8, which is elastically deformable but to the greatest extent remains fixed in place.

Figure 2:
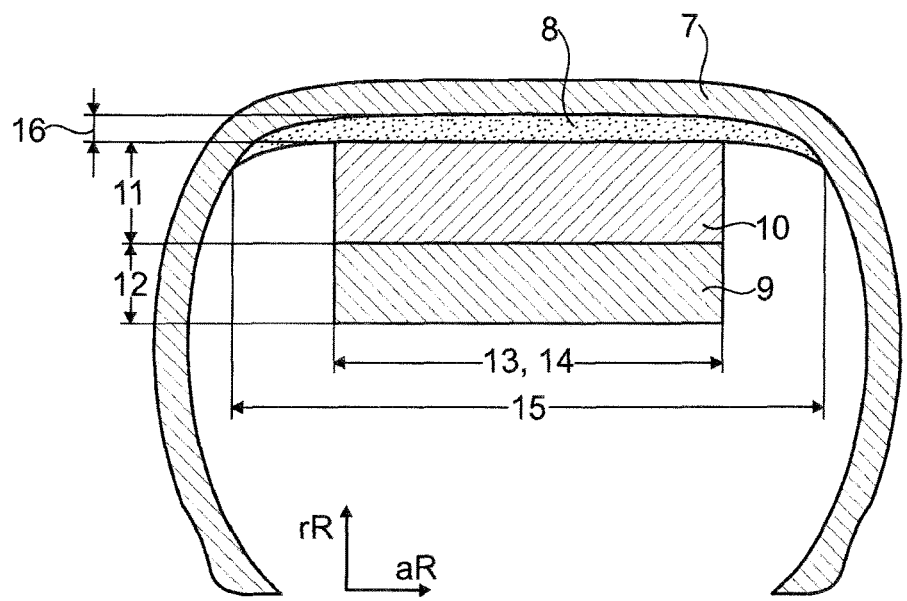
FIG. 2 shows a cross section through the inner layer and the components arranged radially inward with respect to the inner layer of a pneumatic vehicle tire according to an embodiment of the invention.

FIG. 2 shows a cross section through the inner layer 7 and the components (8, 9, 10) of a pneumatic vehicle tire according to an embodiment of the invention that are arranged radially inward with respect to the inner layer. The pneumatic vehicle tire according to the embodiment of the invention differs in particular from the prior-art pneumatic vehicle tire of FIG. 1 in that a closed-cell material ring, here a closed-cell foam ring 10, with an airtight effect is arranged between the sound-absorbing open-cell foam ring 9 and the sealant 8.

The closed-cell foam ring 10 and the open-cell foam ring 9 are bonded to one another by an adhesive and respectively have an approximately rectangular cross section. The closed-cell foam ring 10 lies with its radially outer surface fully flush on the sealant 8 and lies with its radially inner surface fully flush up against the open-cell foam ring 9. The width 13 of the closed-cell foam ring 10 is equal to the width 14 of the open-cell foam ring 9. The sealant 8 has a greater width 15 than the foam ring 9. The closed-cell foam ring 10 has a thickness 11 of approximately 30 mm, measured in the radial direction (rR). The open-cell foam ring 9 has a thickness 12 of approximately 20 mm, measured in the radial direction (rR). The sealant 8 is a polyurethane gel. The sealant 8 has a thickness of <5 mm.

Figure 3:
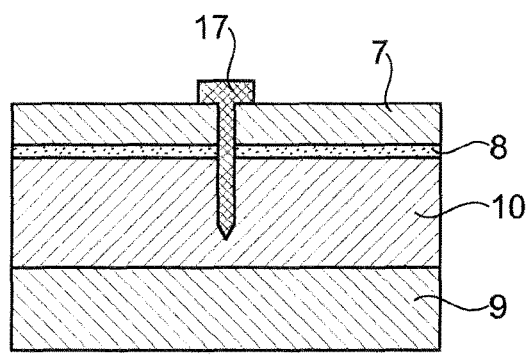
FIG. 3 shows a detail through the cross section of FIG. 2 with a penetrated foreign body.
Figure 4:
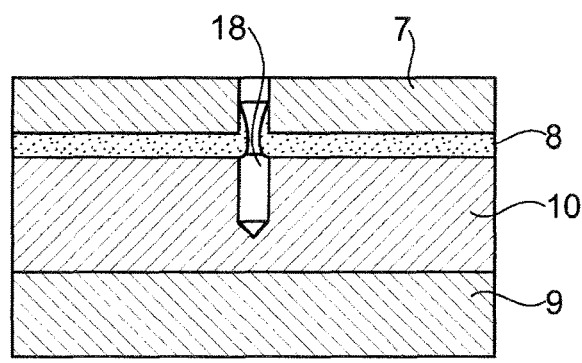
FIG. 4 shows a detail through the cross section of FIG. 2 with an air channel which has been created by a foreign body that has penetrated but been ejected again; and, FIG. 5 shows the cross section of FIG. 2 with additional embodiments.

FIG. 3 shows a detail through the cross section of FIG. 2 with a penetrated foreign body, while FIG. 4 shows a detail through the cross section of FIG. 2 with an air channel 18 which has been created by a foreign body 17 that has penetrated but been ejected again. According to the embodiment of the invention, the closed-cell foam ring 10 lying directly on the sealant 8 provides an airtight seal in the event of a puncture. This sealing by the closed-cell foam ring 10 has the effect of ensuring the sealing effect of the tire in cases of punctures and remaining air channels 18 in spite of the sealant 8 having adversely affected flow characteristics.

FIG. 5 shows the cross section of FIG. 2 with additional embodiments. The closed-cell material ring 10 is divided and lies with its radially inner surface fully flush up against the open-cell foam ring 9. The support on the sealant 8 is provided by 2 or more supports. It is expedient if the supports are arranged in the circumferential direction of the tire, transversely to the circumferential direction of the tire or at an angle thereto, continuously or discontinuously. As a result, the stiffness in the circumferential direction or transversely thereto is increased.

It is understood that the foregoing description is that of the preferred embodiments of the invention and that various changes and modifications may be made thereto without departing from the spirit and scope of the invention as defined in the appended claims.

LIST OF REFERENCE NUMERALS

1 Tread
2 Sidewall
3 Bead region
4 Bead core
5 Breaker belt assembly
6 Carcass insert
7 Inner layer
8 Sealant ply
9 Sound-absorbing open-cell foam ring
10 Closed-cell foam ring
11 Thickness of the closed-cell foam ring
12 Thickness of the open-cell foam ring
13 Width of the closed-cell foam ring
14 Width of the open-cell foam ring
15 Width of the sealant ply
16 Thickness of the sealant ply
17 Foreign body
18 Air channel

What is claimed is:
1. A pneumatic vehicle tire comprising:
an inner surface;
a tread;
a self-sealing sealant on said inner surface;

a sound-absorbing open-cell foam ring arranged inside the pneumatic vehicle tire and being adhesively attached to said inner surface opposite from said tread;

said sound-absorbing open-cell foam ring adhering to said self-sealing sealant;

said self-sealing sealant being applied on said inner surface before said sound-absorbing open-cell foam ring is attached to said inner surface;

said self-sealing sealant having, at least immediately after being applied, a tackiness required for an adhesive attachment of said sound-absorbing open-cell foam ring;

a closed-cell material ring arranged between said sound-absorbing foam ring and said self-sealing sealant; and, said closed-cell material ring lying directly on said self-sealing sealant to provide an airtight seal.

2. The pneumatic vehicle tire of claim 1, wherein said closed-cell material ring includes at least one of a foam, a cork, an elastomer, or a combination thereof.

3. The pneumatic vehicle tire of claim 1, further comprising:

an adhesive; and, said closed-cell material ring and said open-cell foam ring being bonded to one another by said adhesive.

4. The pneumatic vehicle tire of claim 1, wherein said closed-cell material ring has a maximum radial thickness of ≤50 mm.

5. The pneumatic vehicle tire of claim 1, wherein said closed-cell material ring has a maximum radial thickness of 20 mm to 40 mm.

6. The pneumatic vehicle tire of claim 1, wherein said open-cell foam ring has a radial thickness of ≥10 mm.

7. The pneumatic vehicle tire of claim 1, wherein said open-cell foam ring has a radial thickness of 20 mm to 40 mm.

8. The pneumatic vehicle tire of claim 1, wherein said self-sealing sealant is a polyurethane gel.

9. The pneumatic vehicle tire of claim 1, wherein said self-sealing sealant is a viscous mixture based on butyl rubber, a polybutene or is based on silicone.

10. The pneumatic vehicle tire of claim 1, wherein:

said closed-cell material ring has a first width, a radially outer surface and a radially inner surface;

said open-cell foam ring has a second width and a radially inner surface;

said closed-cell material ring lies with said radially outer surface fully flush on said self-sealing sealant;

said closed-cell material ring lies with said radially inner surface fully flush on said open-cell foam ring; and, said first width of said closed-cell material ring being equal to said second width of said open-cell foam ring.

11. The pneumatic vehicle tire of claim 1, wherein:

said closed-cell material ring has a radially inner surface and radially outer surface, wherein said radially outer surface is divided;

said closed-cell material ring lies with said radially inner surface fully flush on said open-cell foam ring;

said open-cell foam ring is supported together with said closed-cell material ring on said self-sealing sealant by two or more supports;

said open-cell foam ring has a width; and, said closed-cell material ring has a width being equal to said width of said open-cell foam ring.

12. The pneumatic vehicle tire of claim 1, wherein:

said self-sealing sealant is a sealant ply and has a layer thickness;

said layer thickness of said self-sealing sealant is ≤2 mm in a first region in which said closed-cell material ring lies directly on said self-sealing sealant; and, said layer thickness of said self-sealing sealant is between 2 mm and 6 mm in a second region in which said closed-cell material ring does not lie directly on said self-sealing sealant.

13. The pneumatic vehicle tire of claim 1, wherein:

said self-sealing sealant is a sealant ply and has a layer thickness;

said layer thickness of said self-sealing sealant is ≤1 mm in regions in which said closed-cell material ring lies directly on said self-sealing sealant; and, said layer thickness of said self-sealing sealant is <5 mm in a second region in which said closed-cell material ring does not lie directly on said self-sealing sealant.

14. The pneumatic vehicle tire of claim 11, wherein said two or more supports are continuously arranged in a circumferential direction of the pneumatic vehicle tire or in a direction at an angle to the circumferential direction of the pneumatic vehicle tire.

15. The pneumatic vehicle tire of claim 11, wherein said two or more supports are discontinuously arranged in a circumferential direction of the pneumatic vehicle tire or in a direction at an angle to the circumferential direction of the pneumatic vehicle tire.

* * * * *